United States Patent [19]

Davis

[11] Patent Number: 5,822,092

[45] Date of Patent: Oct. 13, 1998

[54] SYSTEM FOR MAKING A HOLOGRAM OF AN IMAGE BY MANIPULATING OBJECT BEAM CHARACTERISTICS TO REFLECT IMAGE DATA

[76] Inventor: Frank Davis, 3518 White Oak Dr., Houston, Tex. 77007

[21] Appl. No.: 648,862

[22] Filed: May 16, 1996

Related U.S. Application Data

[63] Continuation of Ser. No. 140,909, Oct. 25, 1993, abandoned, which is a continuation-in-part of Ser. No. 220,080, Jul. 18, 1988, Pat. No. 5,262,879.

[51] Int. Cl.⁶ .............................. G03H 1/10; G03H 1/26
[52] U.S. Cl. .............................. 359/10; 359/11; 359/28; 359/900; 369/103; 365/125; 365/216
[58] Field of Search ................ 359/1, 9, 10, 11, 359/21, 22, 28, 900; 369/103, 109; 365/125, 216

[56] References Cited

U.S. PATENT DOCUMENTS

| | | |
|---|---|---|
| 3,560,071 | 2/1971 | Silverman et al. . |
| 3,615,123 | 10/1971 | Wuerker . |
| 3,829,838 | 8/1974 | Lewis et al. ............................... 359/22 |
| 3,832,027 | 8/1974 | King . |
| 3,887,276 | 6/1975 | Clay et al. ................................ 359/22 |
| 4,001,874 | 1/1977 | Lacotte ..................................... 359/22 |
| 4,111,519 | 9/1978 | Gillis et al. . |
| 4,206,965 | 6/1980 | McGrew .................................... 359/9 |
| 4,212,536 | 7/1980 | Bencze et al. . |
| 4,430,668 | 2/1984 | Miles, Jr. . |
| 4,498,729 | 2/1985 | Benton . |
| 4,498,740 | 2/1985 | Caulfield . |
| 4,655,542 | 4/1987 | Dube . |
| 4,778,262 | 10/1988 | Haines . |
| 5,058,992 | 10/1991 | Takahashi ............................... 359/558 |
| 5,119,214 | 6/1992 | Nishii et al. . |
| 5,138,471 | 8/1992 | McGrew . |
| 5,216,527 | 6/1993 | Sharnoff et al. ......................... 359/10 |
| 5,262,879 | 11/1993 | Davis ....................................... 359/10 |
| 5,291,317 | 3/1994 | Newswanger . |

FOREIGN PATENT DOCUMENTS 000467601A 1/1992 European Pat. Off. .

OTHER PUBLICATIONS

M. Nakajima et al. Computer–Generated Polarization Holography: Automatic Hologram Making System and the Quality of the Reconstructed Image, Proceedings of ICO–11 Conference (Sep. 10–17, 1978).

*Primary Examiner*—Ricky D. Shafer

[57] ABSTRACT

A system for converting an image into a hologram formed from diffraction gratings includes obtaining image data for each pixel in an image to be converted, putting it into digital form and using the image data to control portions of a laser beam split into a reference beam and at least one object beam. The diffraction gratings are formed by an interference pattern of a reference beam and at least one object beam intersecting on the surface of a photoresist material on a pixel-by-pixel basis. Modulation of at least one object beam and adjustment of the angle at which that beam interferes with the reference beam on the photoresist material is used to reflect image data for each pixel of the image being converted into a hologram consisting of diffraction gratings. By using this technique and selecting the spacings between pixel pairs on the photosensitive surface, the angle at which a viewer will see a predetermined image or reflecting light from the hologram is determined, as well as the apparent position of the image created by reflecting light from the hologram constituted by the spaced diffraction gratings.

2 Claims, 8 Drawing Sheets

SYSTEM FOR MAKING A HOLOGRAM OF AN IMAGE BY MANIPULATING OBJECT BEAM CHARACTERISTICS TO REFLECT IMAGE DATA

This application is a continuation of U.S. patent application Ser. No. 08/140,909, now abandoned which is a continuation-in-part of U.S. patent application Ser. No. 07/220,080, filed Jul. 18, 1988, now U.S. Pat. No. 5,262,879.

TECHNICAL FIELD

The present invention relates generally to the manufacture of holographic substrates or holograms, and more particularly to the manufacture of holograms of images by manipulating laser beams to reflect image data.

BACKGROUND ART

Holograms composed of gratings formed by interference patterns generated using coherent monochromatic light from the laser are used in a variety of applications. One such application is the provision of holograms as identity or security devices on credit cards. In order to provide holograms on large numbers of credit cards, it is necessary that a master copy of the hologram be made so that multiple copies can be duplicated in a process similar to that of "stamping out" records. One example of a procedure for the conversion of a photograph into a hologram is found in U.S. Pat. No. 3,832,027. This patent includes a disclosure describing a procedure in which a two-dimensional photograph is converted into a hologram by means of computer data processing. Multiple views of the photograph are aggregated to provide the ultimate view which image upon which the holographic gratings constituting the hologram are formed.

Additional background regarding the manufacture of holograms is found in an article entitled "Diffraction Gratings" published at page E-29 of the 1984 edition of the "Optical Industry and Systems Purchasing Directory". This publication describes the manufacture of holographic gratings by the interference of two beams of coherent monochromatic light altering a photosensitive material which is used as the master for turning out copies of the hologram. The interference fringes of the two light beams are formed where the two coherent light beams come together to cancel or reinforce the peaks and valleys of each of the beams. These interference fringes result in a physical altering of the photosensitive material so that a series of grooves are formed. The ultimate image formed by reflecting light from the holographic gratings is determined by the spacing of those gratings.

Another method for making a chromatic holographic image is found in U.S. Pat. No. 4,498,729. The method includes the steps of making a monochromatic hologram on a first photographic plate, then making a diffraction grating by exposing a second photographic plate to a series of co-linear point sources of mutually coherent monochromatic light. Then the exposed plate is developed and bleached to produce the diffraction grating. A second hologram is made by exposing a third photographic plate to an image from a narrow elongated strip of the first hologram with the diffraction grating in the optical path. The achromatical ray is made by holographically recording the image produced by eliminating the second hologram with monochromatic light on a fourth photographic plate.

Because of the complexity of handling multiple overlapping images computer aided holography such as that disclosed in U.S. Pat. No. 4,778,262 has been required in the conventional art for precise holography. In this patent, an illumination model is provided to specify sources of light rays and dispersion particles of the object. Each light ray being specified by a path and an intensity function is traceable from a source via the object to a set of points and space by the computer. The hologram is synthesized from a plurality of smaller hologram elements. Each individual element sustains a field of view of the object. The light rays from the object line within the field of view and along the lines of sight are sampled by the computer. Optical means are employed to physically reproduce the sample light rays using coherent radiation. The reproduced coherent light rays are then interfered with a coherent reference beam to form the hologram element. In the alternative, the hologram elements are calculated using a computer. Using this technique, the holographic surface is logically partitioned into a grid within the computer, where the contribution of light from the object to each grid element is envisioned as a bundle of light rays emanating from each part of the object and converging onto each grid element. The intensity of each ray of light arriving at a given grid element is determined by the computer by tracing the light ray from its source to the associate part of the object and then onto the grid element in accordance with the given illumination model. Thus, a "tree" of light rays, each in terms of direction and intensity is generated for each grid element. Since the illumination model can be manipulated on the computer, the rendering of the object can easily be modified. This enables complicated lighting of the object not readily practical by physical means. The entire hologram is synthesized by forming, in turn, the hologram element at each grid element on the holographic surface. This is done by either reproducing the associated "tree" of light rays associated with a predetermined grid using coherent radiation and made to interfere with a coherent reference beam, or simulating the same on the computer.

Multiple exposures of images is a necessary expedient in the conventional art. As indicated in U.S. Pat. No. 3,615,123, a holographic system for recording multiple-exposure holograms requires the use of a pulsed laser. Using this technique, each repetitive reference beam is deflected so that it reaches the recording material at a plurality of discrete different angles. Each of the multiple-exposure recordings of the hologram may be produced by a reference beam having the same angle as that at which it was taken. A reference beam may, for example, be deflected by utilizing an electro-optical retarder followed by a birefringent crystal for deflecting the beam in accordance with its direction of polarization. The paths of the reference beams for each discrete angle may be equalized by the provision of a plurality of reflectors disposed along in ellipse having the recording material in a first reflector as its focal points.

In order to distinguish and phase and amplitude differences, the system of U.S. Pat. No. 4,212,536 used a technique of holographic subtraction with phase modulation. In this technique, two substantially identically patterned transparencies, i.e., a master photo mask and a copy thereof are compared with each other by transluminating the master with an object beam, producing a hologram of that master by letting the object beam interfere with a reference beam from a common source of coherent light such as a laser. The copy is placed in the path of the object beam formerly occupied by the master and the developed hologram is positioned at the intersection of the two beams to generate a compound beam of zero intensity if the two transparencies are identical. The luminous energy of the compound beam thus varies inversely with the degree of equivalency of the two transparencies. The compound beam may be imaged onto a receiving surface with certain areas thereof blocked out to eliminate error indications from marginal zones.

The conventional technology also encompasses the use of holograms for information storage. In U.S. Pat. No. 4,111,519, a bite of binary of data to be stored is recorded as a synthetic Fourier transformed hologram of the bite of data. A time varying control signal representing the synthetic hologram is used to intensity modulate a coherent light beam as the beam scans transversely across a photosensitive recording film. The amplitudes of different spatial frequencies in the data band are differently altered to compensate for signal-to-noise roll-off over the data band. The thus compensated signals are also modified to compensate for non-linear gain characteristics. The thus modified signals are also processed to provide the modulating control signal. During the read-out process, an inverse Fourier transformation is performed optically on the light diffracted by the synthetic hologram in order to produce the original bite of data in the form of an optical intensity pattern. This pattern is transversely distributed on an array of photosensitive detectors which converts the optical intensity pattern to an electrical data signal. During this read-out process, a tapered neutral density filter, i.e., a wedge filter, is employed in front of the photosensitive detectors to provide attenuation or gain across a spatial frequency bandwidth to compensate for system modulation transfer function.

Data along the Z axis is also encompassed by the conventional art as indicated by U.S. Pat. No. 4,498,740. In this system, a hologram is written from X, Y and Z data by representing an information beam at a holographic medium with X and Y coordinates represented by X and Y position on the medium and Z coordinates represented by distance between the holographic medium and a point position of the beam close to the medium, while simultaneously presenting a reference beam in interference with the information beam. The size of the reference beam is comparable to the size of the information beam at the holographic medium. In this system, the area of the information beam and the reference beam at any position on the holographic medium is a small fraction of the total area of the hologram.

Conventional art techniques are able to transfer only limited amounts of image information (or other data) into the control of the process for forming diffraction gratings. Consequently, there are severe limitations as to the clarity and accuracy of the images that can be produced from conventionally made holograms.

DISCLOSURE OF THE INVENTION

One object of the present invention is to provide an accurate pixel-by-pixel representation of a copied image on a hologram constituted by diffraction gratings.

Another object of the present invention is to provide a system for quickly and accurately conveying image information on a pixel-by-pixel basis to a holographic grating.

Yet another object of the present invention is to provide a system for making holograms in which the image is adjusted based upon the angle of a viewer with respect to the hologram.

Still a further object of the present invention is to provide a system in which the apparent position of an image for a viewer in a predetermined position is based upon pixel playback angle.

These objects are accomplished according to the present invention in which positional data (using an X-Y coordinates system) and image data for each pixel of a plurality of pixels representing an image is obtained, stored, and used to control an apparatus for making a hologram composed of diffraction gratings. The apparatus is controlled so that a laser beam is split into a reference beam and at least one object beam used to represent image data for a corresponding pixel. The reference beam and other beam(s) are recombined at a photoresist material to form an interference pattern. The angle of the object beam(s) with respect to the photoresist surface and the duration of the object beam(s) interfering with the reference beam are used to convey data regarding the corresponding pixel. Additional pixel data can be conveyed by multiple exposures of the single object beam (with the reference beam) or by exposures of a plurality of object beams for each pixel. A movable table is used to move the photoresist from one pixel location to another in accordance with the X-Y coordinate system by which the pixel locations of the original image were determined.

Data in the Z-axis direction including the apparent position of an image reflected from the hologram can be adjusted by adjusting the playback angle of "steroscopic" pixel pairs when forming the diffraction gratings constituting the pixels.

BEST MODE FOR CARRYING OUT THE INVENTION

Figure 1:
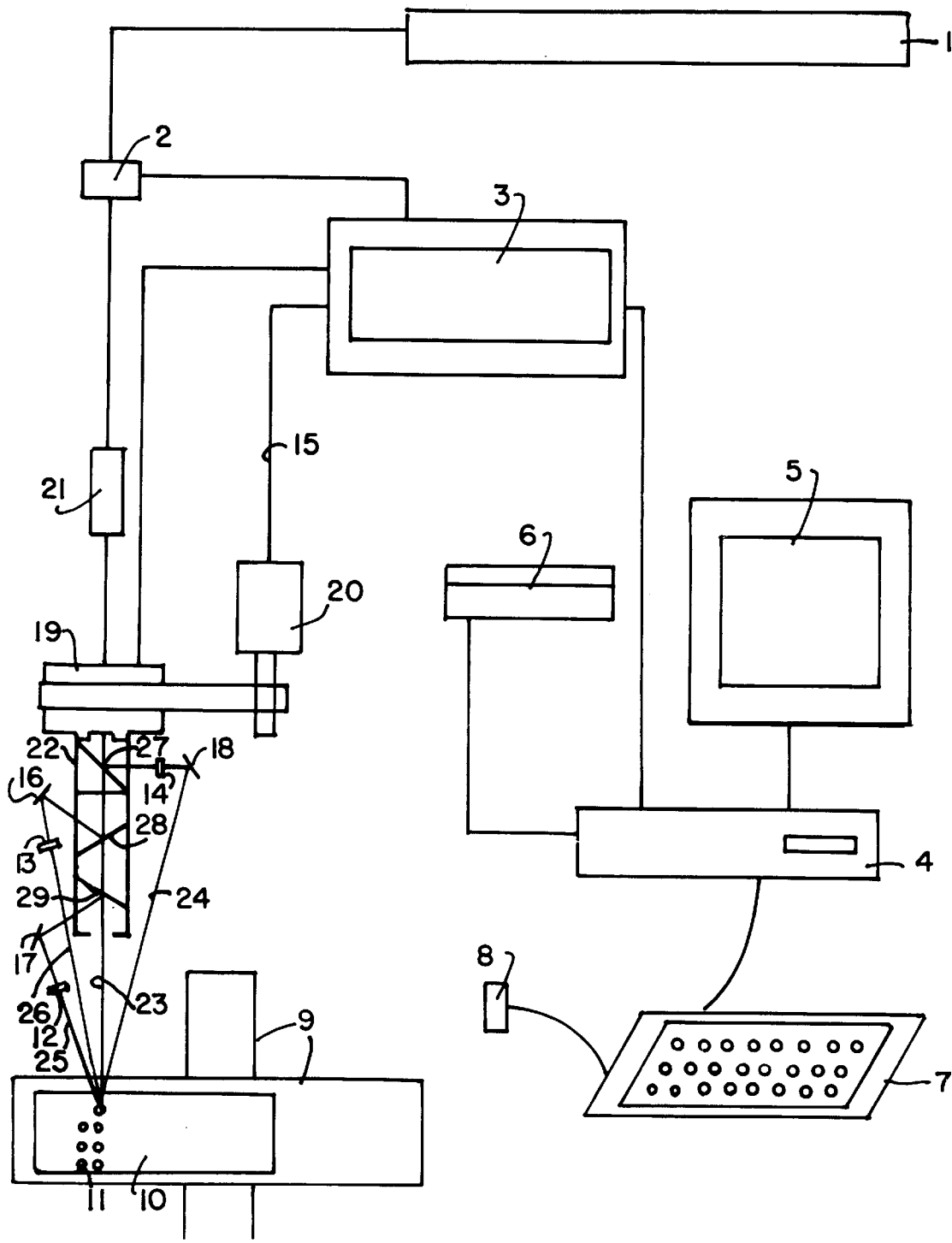
FIG. 1 is a block diagram of a first embodiment of the present invention.

FIG. 1 illustrates a first embodiment of the present invention having the capability of splitting a coherent light beam from laser 1 into a reference beam 23 and a plurality of object beams 24, 25, 26. The subject reference and object beams are directed to interfere with each other at a photoresist surface 10 for each pixel location 11.

Laser 1 generates a beam having a coherence length in a range suitable for forming diffraction gratings constituting a hologram as is well known in this art. The emissions of laser 1 are controlled by means of a main shutter 2 which in turn is controlled through a digital interface 3 by central processing unit 4. The programming which controls the timing of the laser emissions (through shutter 2) and the operation of beam splitter 22, along with shutters 12, 13, 14 is contained within central processing unit 4. Specific commands are given to the central processing unit 4 by means of a mouse 8 and keyboard 7. These commands are displayed by monitor 5 which can also display the image data input from scanner 6.

Color image scanner 6 provides data regarding an image to be copied in the form of digitally encoded words, each representing image data for a particular pixel located within the image on the basis of an X-Y coordinate plot. Image scanners having digital outputs representing pixel data are well known in the scanning and video camera arts. Consequently, further elaboration on such devices is not needed for purposes of this application.

A color image scanner such as that indicated by 6 in FIG. 1 is not necessary for the operation of the present invention. Any device which provides a digital output representative of pixel image characteristics can be used instead. For example, video images can be generated by means of appropriate programs operating in the central processing unit 4. Another type of program that can be operated in central processing unit 4 has the capability of analyzing individual frames from a video recording played in a VCR (video cassette recorder, not shown). The present invention admits to modification by any system or device from which digital image pixel data can be derived, including systems having analog outputs that can be digitized by intermediate interface circuitry (not shown).

The coherent light from laser 1 when timed to enter the system by means of main shutter 2, is focused by main lens assembly 21. A variety of adjustments can be made by the main lens assembly 21 for adjusting the size of the pixels to determine if overlapping interference will take place between pixels to create an effect with the diffraction gratings similar to that created by multiple exposures of photographic film. Other adjustments can be made using main lens assembly 21 to configure the shape of the coherent beam as well as any other adjustment deemed appropriate, as is discussed in this application, infra.

The adjusted coherent light from main lens assembly 21 enters beam splitter assembly 22. Where a series of beam splitters 27, 28, 29 divide the adjusted coherent light beam into a reference beam 23 and a series of object beams. The object beams are reflected to photosensitive blank 10 by means of reflecting mirrors 16, 17, 18, and are controlled by shutters 12, 13, 14. The beam splitter assembly 22 is rotatably mounted on rotating head bearing mount 19, and the movement of the beam splitter assembly 22 is controlled by stepping motor 20.

The photosensitive blank 10 is moved from one pixel location 11 to another with respect to the reference beam 23, by means of X-Y stage 9. Preferably the X-Y stage 9 is mounted on an isolation structure in order to prevent stray vibration from mispositioning a pixel 11 when corresponding diffraction gratings are being formed on the photosensitive blank 10 by the interference of reference beam 23 and one of the object beams 24, 25, 26.

In the embodiment illustrated in FIG. 1, the angle of incidence of each of the object beams (also known as color beams) 24, 25, 26 are changed to reflect different image data from pixel to pixel. The angle of incidence of the object beams can reflect different angles at which a viewer of an image resulting from light reflecting from the hologram will have an optimum view of the image, or will be able to distinguish different aspects of that image. The angle of incidence of a given object beam can also be used to convey other image data for each pixel, such as color data, brightness data or gray scale data.

A variety of different types of image data can be formed as part of the diffraction grating for each pixel by means of multiple exposures of the same or other object beams to create multiple interference patterns at any selected pixel. The rotation of the beam splitter assembly 22 by motor 20 and rotating mount 19 provides the capability of a larger number of different incidence angles (and thus, interference patterns) to convey large amounts of image information for each pixel. Further, because the angles of incidence of the object beams can be changed rapidly by motor 20 as controlled by central processing unit 4, the process of encoding large amounts of information for each pixel on the photosensitive surface 10 can be carried out quickly and efficiently.

It is noted that the rotating lens assembly is not needed to convey substantial amounts of image data for each pixel 11. Instead, a fixed beam splitter assembly 22 can be used and the image data for each pixel (such as color information) can be conveyed by modulating the object beams 24, 25, 26 using shutters 12, 13, 14, as described in the allowed parent application, U.S. patent application Ser. No. 07/220,080. Disclosed therein is a system having the capability of conveying color information based upon the amount of time each object beam (representing one of the primary colors) would interfere with the reference beam. Using this scheme, a larger number of color variations (based upon the three primary colors, each associated with an object beam having a predetermined angle of incidence with respect to the irradiated photosensitive surface) could be conveyed by interference patterns and stored on the photoresist surface in the form of diffraction gratings. The paths of the object beams are substantially equal in length but this is not necessary. Rather, the object beams must be in the range of the coherence length of the laser used. For example, if the coherence length of a laser used is 2", a first beam path can be 4'2" while another beam path can be 4'1", and another beam path can be 4'3", all remaining within the coherence length of the laser.

While the system of the parent application discloses only three beam splitters, fewer beam splitters (such as one resulting only in a single object beam) or a greater number of beam splitters (resulting in a greater number of object beams) can be employed so that greater numbers of color variations are possible.

As illustrated in FIG. 1, both types of object beam control can be combined. Further, the rotating beam splitter assembly 22 permits a large number of different angles of incidence for the object beams so as to preclude the necessity of adding additional beam splitters such as 27, 28, 29 in order to obtain a greater number of object beams. Due to the substantial number of angles of incidence for an object beam, as well as the use of a shutter to modulate the object beam, the system of the present invention can be practiced with only a single object beam rather than the multiple object beams disclosed in FIG. 1.

X-Y stage 9 is preferably mounted on an isolation table to prevent stray movement from causing pixel misalignment. As is common in this technology an isolation table is mounted on a concrete foundation which in turn is also isolated from the surrounding environment (usually by making cuts in a concrete pad supporting the table) so that vibrations in the ground around the isolation table will not be transmitted into the table. Further, the isolation table is also provided with shock absorbers to damp any vibration that is transmitted through the concrete foundation immediately underneath the table.

The central processing unit 4 uses the image data to determine the configuration, angle and timing of the object beams irradiating the photoresist material at each pixel. Using the X-Y coordinate information contained with the image data of each pixel, the central processor directs the X-Y stage to move to the subsequent position after the irradiation of each pixel. The central processing unit 4 also determines if the pixel being currently irradiated is the last pixel of the image along either the X or Y axes. If so, the central processing unit 4 sends instructions to the X-Y stage 9 to move either in the X or Y directions so that irradiation of the next line of pixels can be started. The programming in the central processing unit 4 also determines when the last pixel in the subject image has been reached, and ends the irradiating process after the interference pattern for that pixel is made.

During this movement time, the rotating head (if that particular embodiment is being used) is rotated to the appropriate position for generating the object beam(s) necessary to convey the image data for the next pixel. If multiple exposures are required, the rotating head bearing mount 19 will be adjusted between irradiations to provide the desired object beam angles to convey further image data for that pixel.

Figure 3:
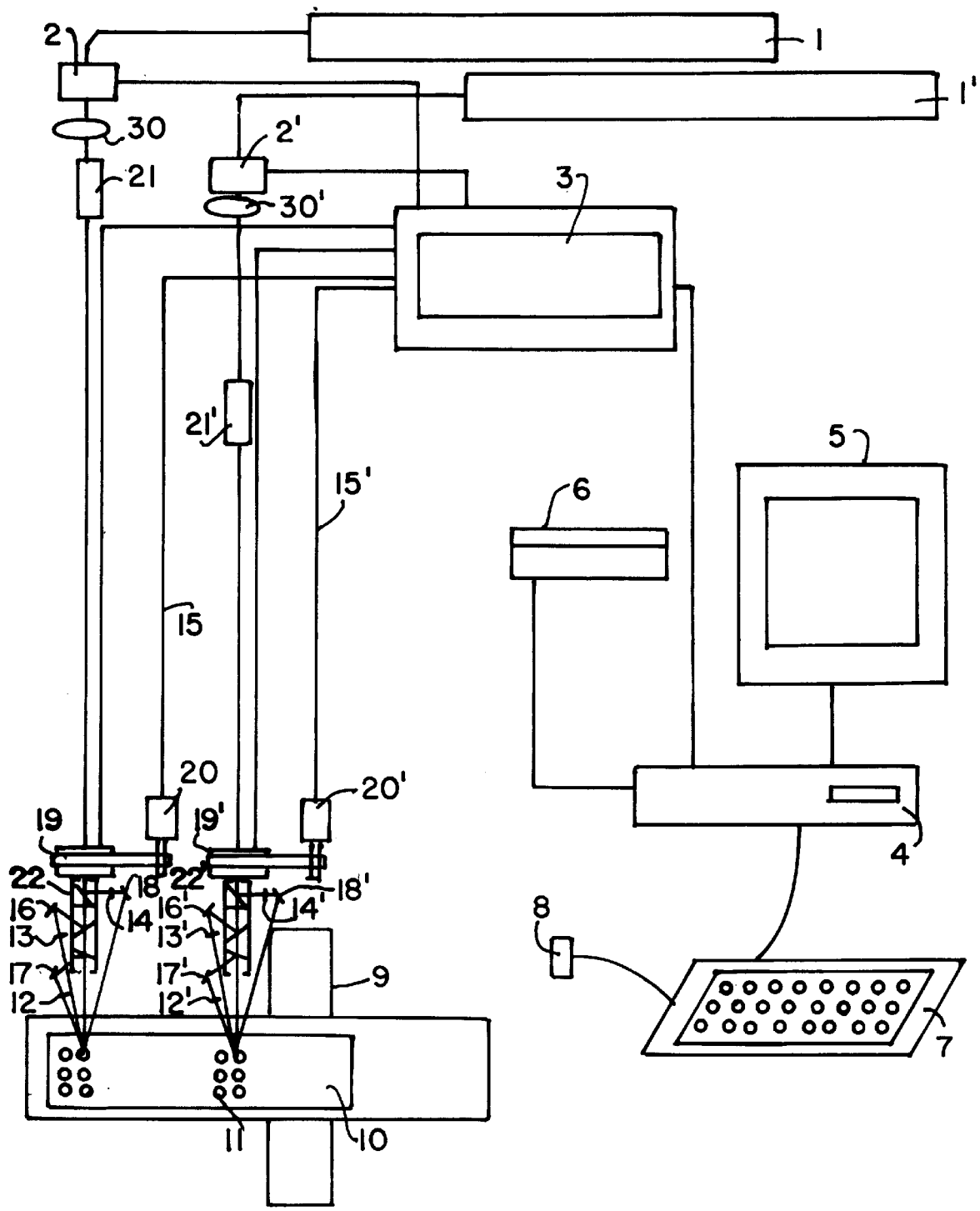
FIG. 3 is a block diagram illustrating a second embodiment of the present invention.

Multiple exposures of individual pixels require time to move the rotating head bearing mount 19 so as to adjust beam splitter assembly 22. This step slows the overall process. One technique for addressing this problem is illustrated in FIG. 3. This arrangement includes dual lasers, optical systems, main shutters, rotating head bearing mounts, and beam splitter assemblies. Each of these elements is the same as that illustrated in FIG. 1. The difference in the FIG. 3 system resides in the programming of central processing unit 4 which must process information for two images on a parallel basis. Because the image data is based upon an X-Y coordinate system, a single image can be easily sub-divided using standard programming techniques. The different portions of the sub-divided image are then treated in the same manner as described with respect to FIG. 1, with the exception that a plurality of image segments are being processed at one time. It is also possible to have more than two laser and optical assemblies. Only the digital interface 3 has to be increased in capacity to handle the additional control operations. Theoretically, the number of laser and optical assemblies used is limited only by the capacity of the central processor 4 to handle multiple parallel processes. However, the system is constrained by the physical dimensions of the rotating head bearing mount 19 and the beam splitter assembly. Because each of these devices takes up a certain amount of physical room, there are limitations as to the number of these devices that can be used to irradiate a single image. Consequently, unless the images and the holograms derived from them are especially large, only a single optical assembly and laser will be used for any single image.

Duplication of the same hologram is easily accomplished using the arrangement of FIG. 3 and does not require the added processing capability of central processor 3. Thus, the arrangement of FIG. 3 lends itself to producing duplicates of the same hologram, thereby saving time while not necessitating additional processing capacity on the part of central processor 4.

It is noted that the overall capability of the present invention is limited by the capacity of central processor 4. Thus, by using a sufficiently powerful processor, expansion of the system of the present invention can extend not only to the manufacture of multiple holograms, but the manufacture of plural holograms at a sufficient rate of speed so as to simulate motion picture projection when light is reflected from the holograms as they are being generated. With sufficient processor capacity, images scanned in real time can conceivably be translated into displayed holographic images using pre-programmed light reflected from the holograms as well as appropriate manipulation of the holographic substrates. The only limitations reside in the processing capacity of central processor unit 4 and the cost of using sufficient lasers and optical systems to achieve either real time holographic projection or stored holograms to be manipulated for future image projection.

Any type of digital information representing image data or that can be modified to represent image data can be used by the present system to create a hologram consisting of diffraction gratings formed on a photosensitive material by light interference. A scanner is not necessary. The image data can be generated by a computer based upon a mathematical formula such as fractal programs or other well known image or pattern generating formulas. Computer generation can also be carried out by manipulating scanned or frozen frame images. Well known computer programs for generating graphics can also be used. Images from a disk or a video tape taken either in real time or from a memory are also usable in the system of the present invention.

Image data can also be obtained by reading a hologram. This is done by sending a coherent reconstruction beam at a predetermined angle to the diffraction gratings of the hologram so as to move pixel-by-pixel in an X-Y coordinate system. Each pixel, when excited by the coherent beam will release its information in a predetermined direction according to the color balance light density and other information stored in that pixel. At the proper play back positions (with respect to light reflected from the hologram) an array of sensors oriented to receive the released information can communicate the information to a computer. This arrangement permits the storage of digital data not only along the X and Y directions (in the plane of the hologram) but along the Z axis (perpendicular to the plane of the hologram).

The data along different axes will not interfere with each other since reading the data depends upon the position of the viewer (or the sensors) in relationship to the predetermined path of the reconstruction beam. The optimum reconstruction beam path is directly related to the position of the holographic gratings and their geometric position. If the holographic plate is in a fixed position and a light source was positioned at the optimum reconstruction angle and distance from the holographic plate, a viewer (or a set of sensors) could be moved from side to side, up and down, and back and forth, and find in every position a different set of colors, images, gray scale information or other data without interference of the information from other groups corresponding to other positions. This is because the storage of any given group of information is absolutely directional. This direction characteristic is controlled by the angles of incidence of the object beams which in turn are determined by the rotating beam splitter assembly 22.

Reconstruction of an image does not require the use of coherent light. Instead, the hologram can be irradiated with point-source light, thus reconstructing the object beams. If done in a sequential manner, this will reveal a series of patterns viewable from the direction of the reference beam. These patterns can be recognized by a computer and given meaningful definitions.

Figure 5:
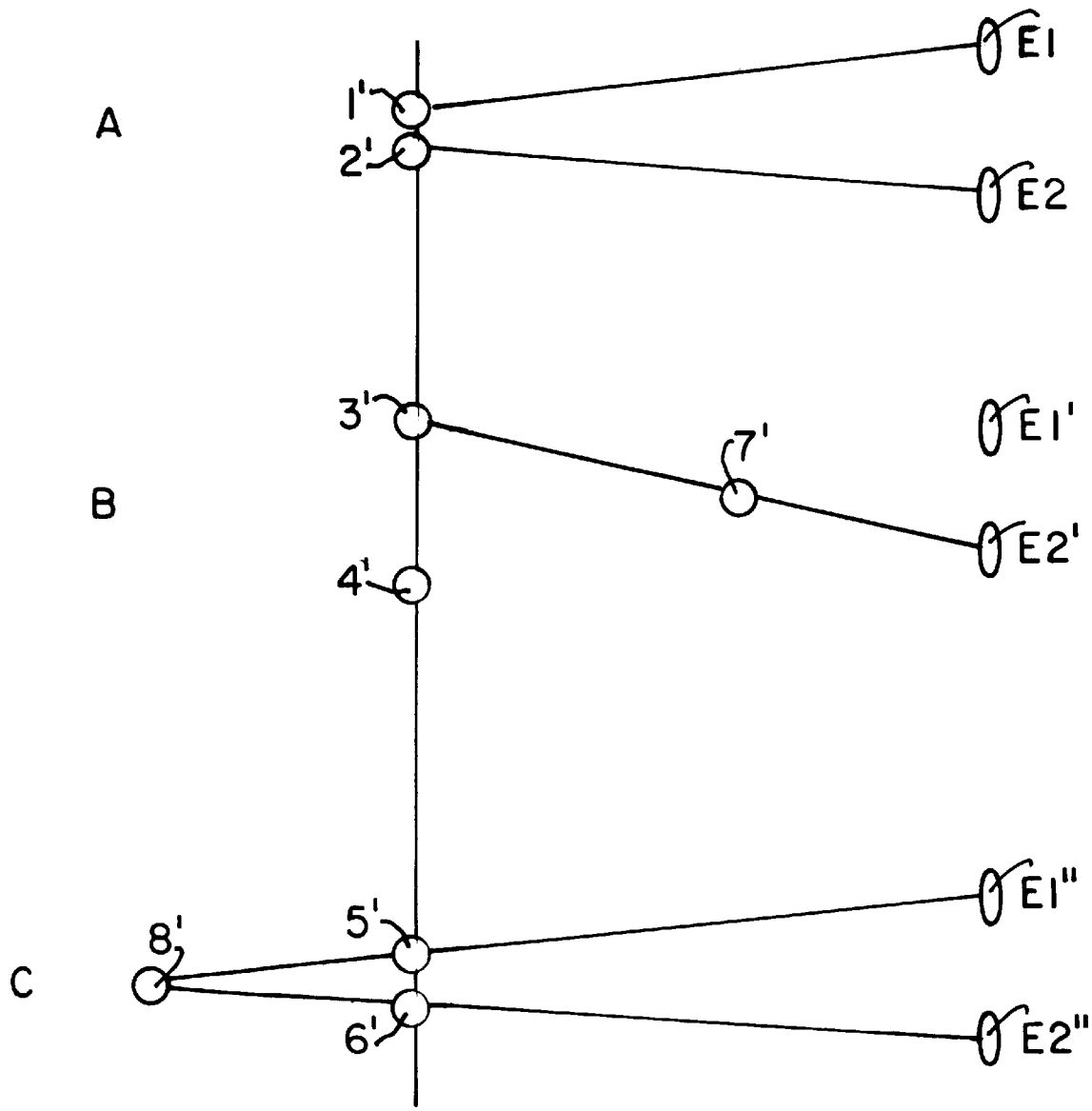
FIG. 5 is a diagram illustrating the relationship between pixel spacing and apparent position of a resulting image to a viewer in a predetermined position.

Manipulation of Z axis characteristics is also used to create and adjust the three-dimensional perspective of the image created from the hologram. FIG. 5 illustrates three different perspectives adjustable by positioning pixel pairs with respect to each other. In example A, the pixel pairs 1, 2 are placed next to each other so that light reflected from these pixels are aimed at adjacent eyes (E1, E2) of a viewer. As a result, the pixels will appear to be on the surface of the hologram. In example B, the two pixels 3, 4 are positioned apart so that light reflected from these pixels will be seen by opposite eyes (pixel 3 corresponding to eye 2 and pixel 4 corresponding to eye 1) of a viewer. The result will be that the viewer believes that dot 7 (the resulting image) is above the plane of the hologram. In example 3, the two pixels 5, 6 are positioned closer than in example B, but still further apart than in example A. Consequently, light reflected from pixel 5 will be directed to E1 while light reflected from pixel 6 will be directed to E2. As a result, the viewer will perceive the resulting image (dot 8) as being located behind the surface of the hologram.

Figure 6:
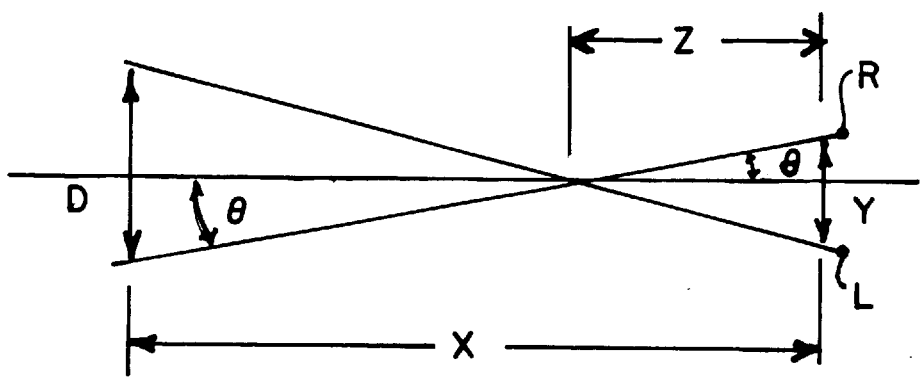
FIG. 6 is a diagram illustrating the relationship between viewing angle and the apparent position of an image.

FIG. 6 is a diagram illustrating the basis for the calculations used to determine pixel spacing to achieve the aforementioned manipulation of a parent position of the resulting image. In FIG. 6, D is the distance between a viewer's eyes. Y is the distance between the pixels (dots) placed on the surface of a photosensitive plate to form the resulting hologram. X is the distance from the observer to the surface of the hologram and Z is the virtual, or perceived displacement of the image along the Z axis (perpendicular to the plane of the hologram). It is noted that this manipulation requires that the reconstruction be white light directed at an ideal angle to the surface of the hologram. Thus, the image can be manipulated due to the fact that each dot can be directed to a single eye. The determination of distance between pixels is made using the formula:

$$\tan \theta = \frac{D/2}{(X-Z)} = \frac{Y/2}{Z}$$

By carrying out the manipulations of the above equation, the distance between two pixels is determined by the formula:

$$Y = \frac{D \cdot Z}{(X-Z)}$$

It is noted that negative value of Y means that two dots appear to have switched thus causing the image to appear behind the surface of the hologram. In the equation, a negative value of Z represents a virtual displacement of the image behind the surface of the hologram.

As previously stated, the information in each pixel can be manipulated by multiple exposures of each pixel. The multiple exposures can be carried out as previously described by discretely applying different combinations of beams for different interference patterns at each pixel. Multiple exposures of pixels can also be carried out by increasing the size of the pixels so that they overlap. This is done by manipulating lens assembly 21 to change the focus of the laser beam before the beam is split in beam splitter assembly 22. This is normally done using a plurality of lenses to first expand and then redirect the laser beam. The laser beam is initially controlled by means of shutter 2 which allows the laser beam to pass into the main lens assembly 21.

Figure 2:
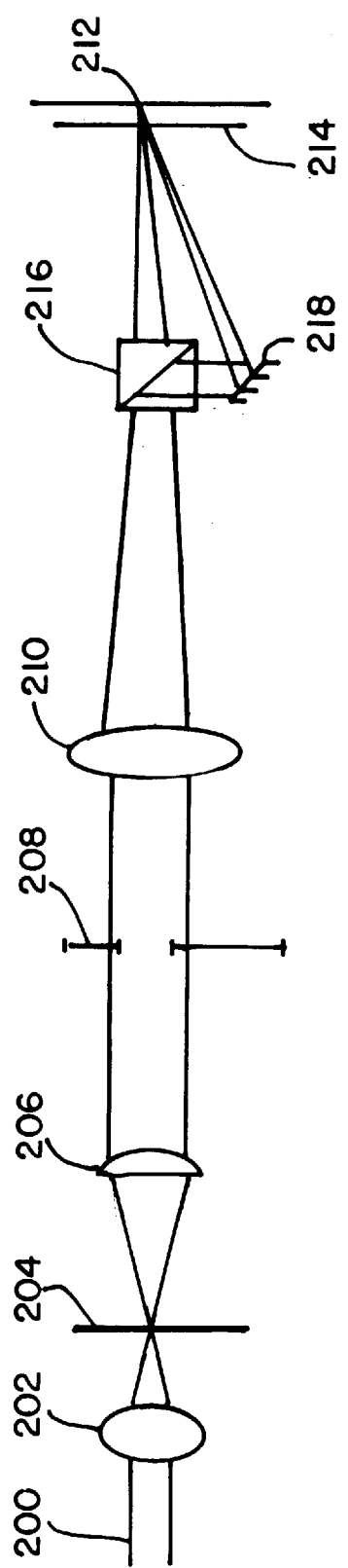
FIG. 2 is a block diagram showing an optical system for carrying out the present invention.

An example of such an assembly is illustrated in FIG. 2. A laser beam 200 passes through lens 202 which directs the laser light to a point at spatial filter 204. The laser light is then redirected to collimating lens 206 which redirects the light so that it is nearly collimated (constituted by parallel beams). The nearly collimated light is adjusted to obtain a desired size of the overall light beam by using a limiting aperture 208. The adjusted light is then directed to focusing lens 210 which determines the size of the pixel 212 when the light ultimately reaches a holographic plate 214. The light from the focusing lens 210 is operated on by a beam splitter 216 and at least one reflecting mirror 218, and recombined to create the interference pattern for pixel 212 on holographic plate 214. Although FIG. 2 illustrates the collimating lens and the limiting aperture arranged before the focusing lens 210 and beam splitter 216, these elements can be placed between the beam splitter and the holographic plate 214. The collimating lens and the limiting aperture can be used with either the reference beam or any of the object beams to manipulate the size and shape of the pixel.

Figure 7:
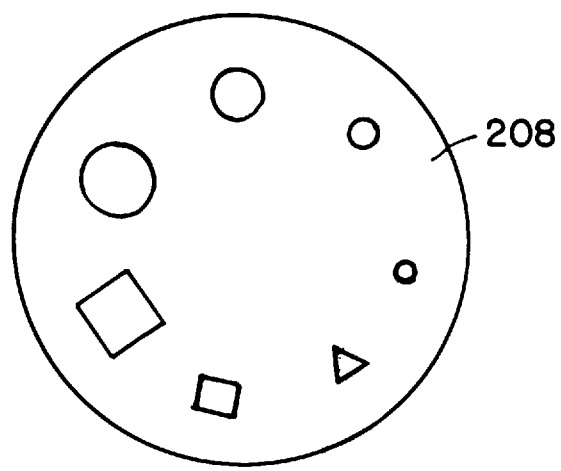
FIG. 7 is a diagram illustrating various apertures through which a collimated light beam passes.

FIG. 7 illustrates a variety of limiting apertures to shape the beam and thus, the pixel being irradiated. Generally, the pixel shape is circular and can be one of a variety of sizes. Using this arrangement, the sharpest focus of the beam can be used while still manipulating the size of the beam (and thus, the size of the resulting pixel) as it impinges on the holographic plate. A variety of different pixel configurations and clusters can be formed using different shapes of limiting aperture, such as a square, a diamond or a triangle. It is noted that these are not the only shapes that can be used, and that the variety of shapes is not limited by the examples of FIG. 7. A designer can use any shape appropriate for the pixel cluster selected for an individual hologram. As illustrated in FIG. 7, the limiting aperture is variable and can be adjusted according to the programming of the central processing unit 4 using digital interface 3 through a cable connection (now shown) to the main lens assembly 21. A motor (not shown) would be used to move the limiting aperture from one position to another. Thus, the aperture size and shape could be adjusted based on the programming in central processor unit 4 during those time periods when the rotating head bearing mount 19 is also being adjusted. The limiting aperture 208 can also include a density filter to change the laser beam from a Gaussian profile to linear profile.

The laser beam can also be modulated in or out of phase or deformed to mimic the effect of having passed through lenses or optical systems, or to mimic having the effect of different optical properties of a variety of different materials. This can be done to collimated or an uncollimated laser beam, either before or after the laser beam is split by beam splitter 216. The laser beam can be further modified by collimating a beam which is passed through the aforementioned density filter. A variety of spatial filters such as that illustrated at 204 in FIG. 2 can also be used at any point in the beam path to filter out beam aberrations which could degrade the quality and accuracy of the resulting hologram. The laser beam path can be further adjusted by means of a light diffuser placed anywhere along the path where considered appropriate. All of the aforementioned light manipulation techniques are well known in this art and are expected to be used whenever appropriate to obtain the desired pixel characteristics in the diffraction gratings on the hologram surface. An additional lens 30 can be added as shown in FIG. 3 to be used as part of an encoding scheme if considered desirable. Such encoding could be used for protection of data stored using the process of the present invention as well as the aforementioned data read-out technique.

Figure 4:
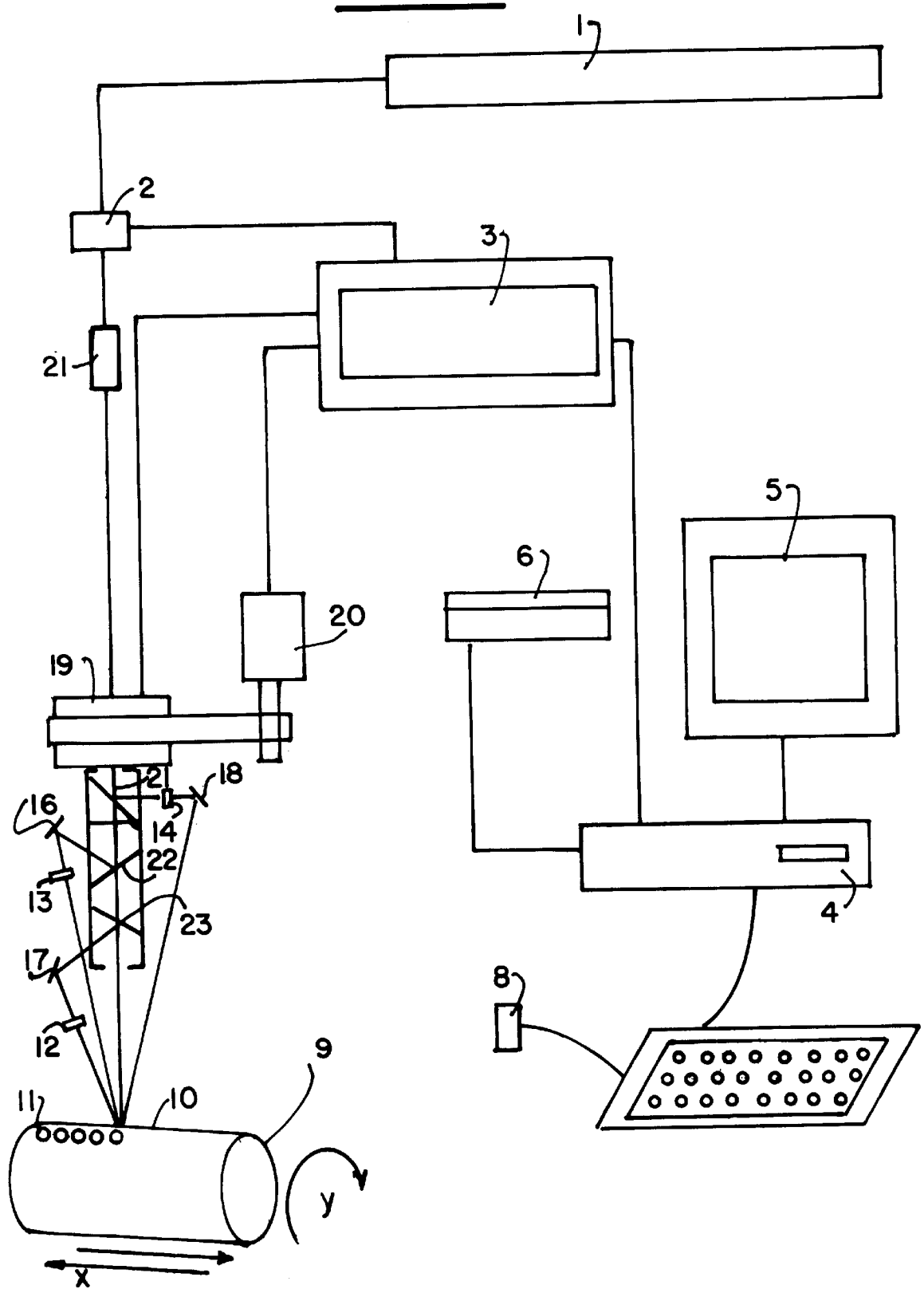
FIG. 4 is a block diagram illustrating a third embodiment of the present invention.

FIG. 4 illustrates an additional embodiment of the present invention. All of the elements are the same as shown in the FIG. 1 embodiment except that an X-Y stage is not used. Rather, the laser irradiates the surface of a photosensitive emulsion on a roller that will be used from embossing a plastic or other production material in what is commonly known as a "wet embossing" technique. The process as illustrated in FIG. 4 will require the further step of hardening the photosensitive emulsion so that it will be able to withstand continuous embossing of a receptive material used for mass-produced holograms. The movement of the photosensitive material is substantially the same as that illustrated in FIG. 1. The only difference is that movement in the Y direction is effected by rotating the cylinder upon which the photosensitive emulsion has been placed. The same control scheme is used for both embodiments; only an adjustment from a linear motion to a rotational motion in one direction being required in the embodiment of FIG. 4.

Figure 8:
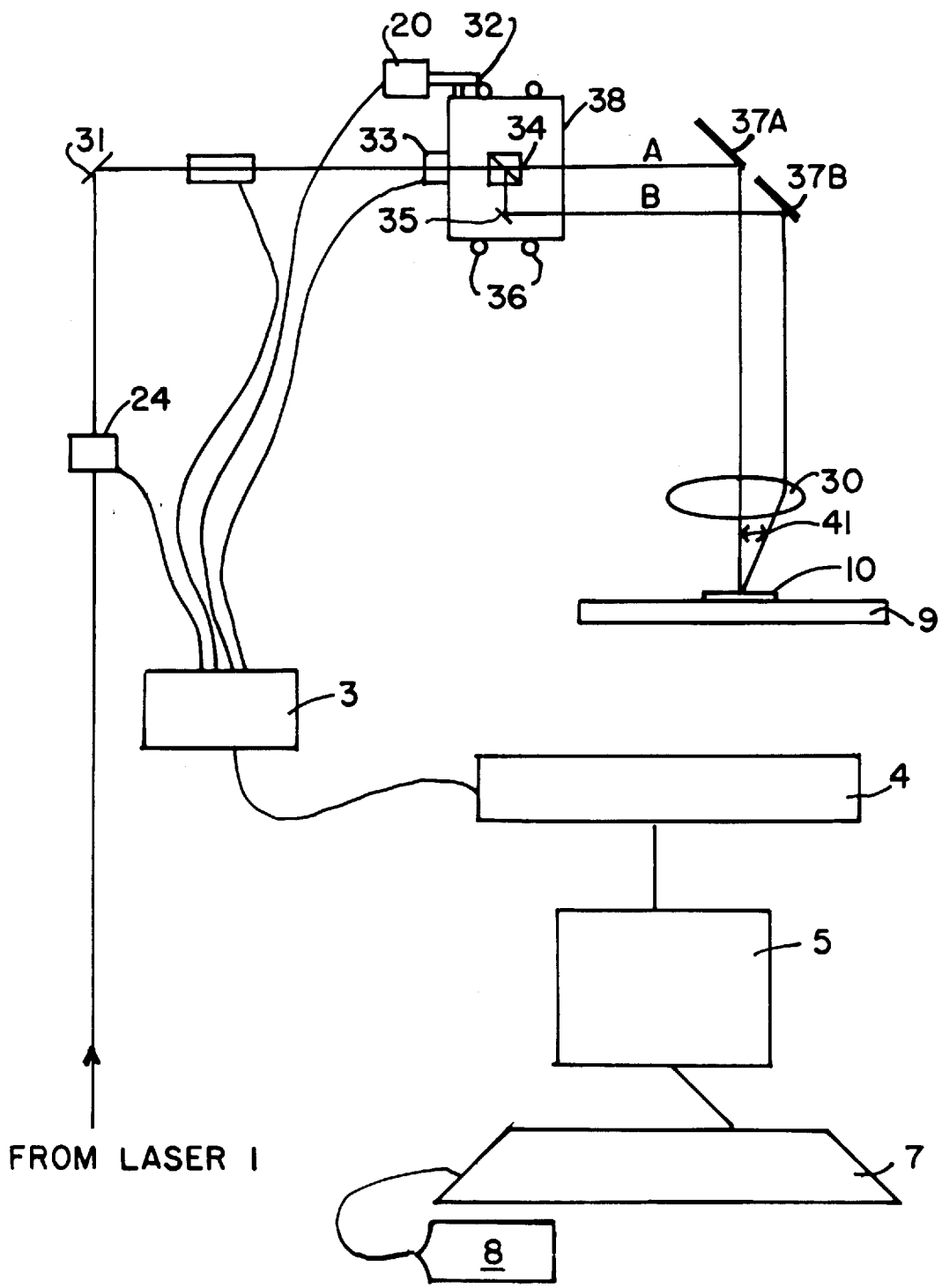
FIG. 8 is a block diagram illustrating two separate techniques for changing the angle between the reference beam and the object beam.

As previously stated, the exact configuration of the optical system 22 as illustrated in FIGS. 1, 3 and 4 is not necessary to carry out the present invention, nor is it necessary to achieve a wide variety of different angles between the reference beam and the object beams. FIG. 8 illustrates an arrangement employing two different techniques for adjusting the angle 41 between the reference beam A and an object beam B. An optical assembly 38 is composed of an outer casing 38 containing a beam splitter cube 34 and a mirror 35 located at a 45° angle to the line of direction of reference beam A. The optical assembly 38 can be rotated using stepping motor 20 operating a drive mechanism 32 which rotates the outer casing 33 by means of roller bearings 39. The angle 41 between the reference beam A and the object beam B can be changed by moving mirror 35 towards or away from beam splitter tube 34 by means of a track mechanism 36.

Angle 41 can further be altered by arranging mirrors 37A nd 37B to be split as shown so that portion 37A is fixed while portion 37B can be moved back and forth using well known mechanical devices so as to move object beam B to various places on lens 30 which is used to recombine the split beams at the photoresist 10. Normally only a change of approximately 12° in angle 41 is required to provide the necessary range of angle differences. Both techniques can be used together, and their range is limited only by the size and placement of lens 30.

Figure 9:
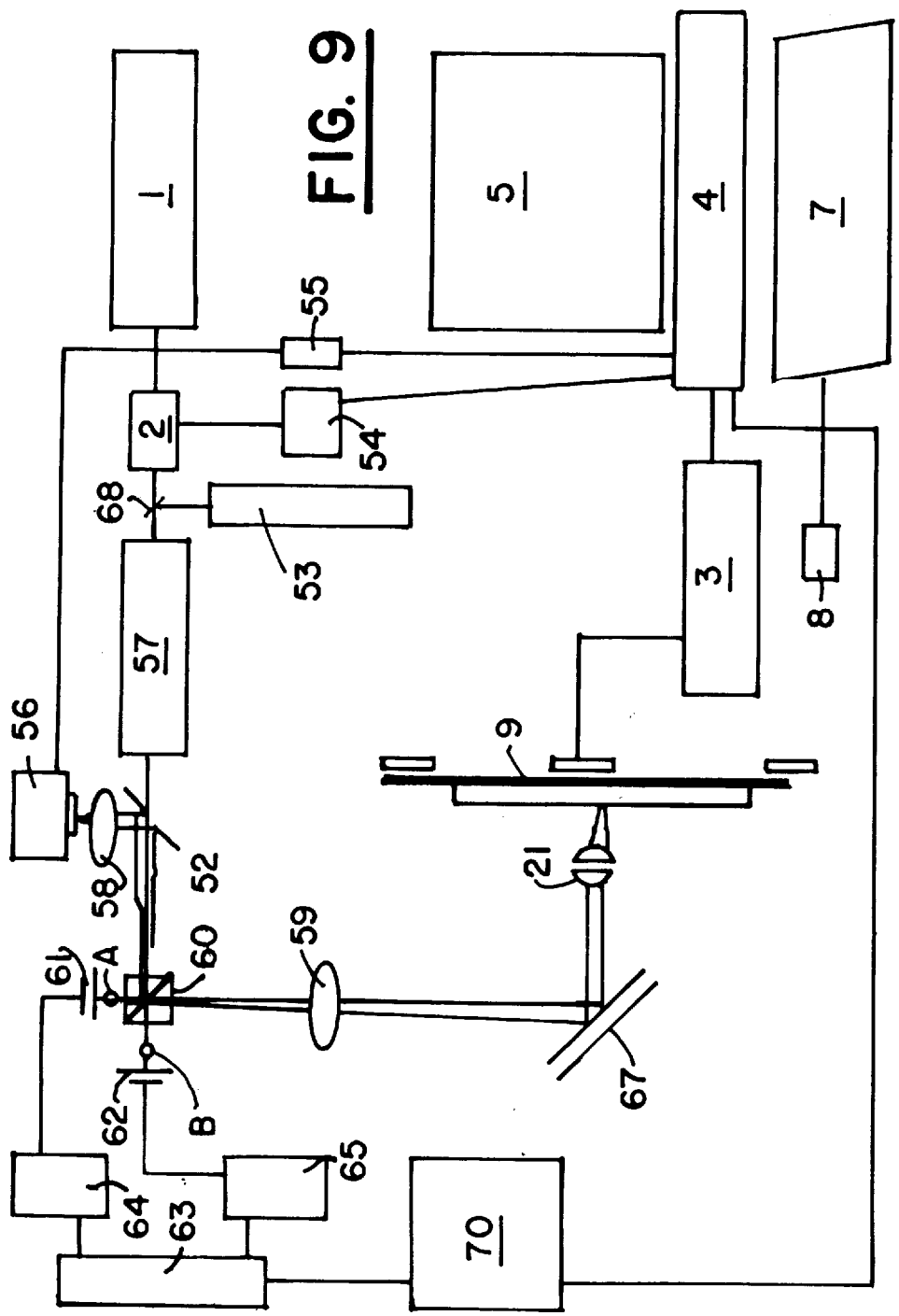
FIG. 9 is a block diagram illustrating an additional technique for controlling the angle of incidence of both object and reference beams, as well as a system for monitoring the correct angle.

Another technique for adjusting the angles of object and reference beams with respect to a photosensitive material on a moveable platen is illustrated by FIG. 9. Also illustrated is an arrangement for detecting deviation in the reflected beams from that desired, and maintaining the desired beam angles with respect to the platen containing the photosensitive material. Since a great deal of video information can be expressed through a substantial number of angle variations and beam intensities, it is necessary that beam angles be regulated within narrow constraints. This is done in the embodiment of FIG. 9 through the use of an auxiliary beam following the path of the main beam, and offset therefrom by a small angle.

As in the previous embodiments, a computer 4, controlled by mouse 8 and a keyboard 7 controls the entire system. A laser 1 such as a helium cadmium (HeCd) laser generates a beam which is controlled by a bi-fringe shutter 2. This shutter is controlled by a driver 51 which in turn is controlled by computer 4. A beam from laser 1 is timed by shutter 2 to pass through beam profiler 57 (used to control pixel size, pixel shape and cross-section). The beam passes through an opening in the mirror 22. The beam is then split in beam splitter 60 into two beams A and B as illustrated. Beam A is reflected from mirror arrangement 61 which is constituted by two mirrors, one deflecting on an X axis and one on a Y axis. Beam B is also reflected by mirror arrangement 62, arranged in a manner similar to mirror arrangement 61. The Y axis mirrors for both 61 and 62 are set at a distance equal to the focal length of collimating lens 59. Beams A and B reflected back from mirror arrangements 61 and 62, respectively, are deflected by beam splitter 60 to be directed through lens 59. Upon emerging from lens 59 the now collimated beams are reflected from mirror 67 and passed through focusing lens 21 to be brought together at a predetermined point on the photosensitive material covering the platen 9. The platen 9 is moved in a predetermined sequence corresponding to pixels in an image by driver 3 which is controlled by computer 4.

Like the rest of the system, the mirror arrangements 61, 62 are controlled by computer 4. This is done through electronic interfaces 70 and 63 which pass instructions to mirror drivers 64 and 65 so that the correct angle deviations of the A and B beams are achieved. Because of momentum and velocity irregularities between the signals sent to mirror array drivers 64 and 65 and the actual beam deviations, a system for detecting and accurately determining these deviations is necessary. This is accomplished through the use of an auxiliary laser beam following a portion of the path taken by the laser beam generated by laser 1, and being reflected so as to be observable so that deviations in the main laser beam are also detected in the auxiliary laser beam.

Laser 53, preferably a helium neon laser generates the auxiliary beam which is reflected by mirror 68 nd configured by profiler 7. The auxiliary beam passes through the opening in mirror 52 and is operated on by beam splitter 60. The auxiliary beam is at a slight angle to the path of the main laser beam. Consequently, light from the auxiliary beam reflected back from beam splitter 60 will impinge upon mirror 52 and be reflected through focusing lens 58 to a position alignment sensor 56, preferably a CCD device. The output signals from this device are processed by an alignment indexer 55 to place the signals in a form which can be handled by computer 4. The computer uses these deviation signals to determine if the main beam will be configured within acceptable parameters, and controls bi-fringe shutter 2 to be in an open position only when acceptable parameters are detected with respect to the output of position sensor 56.

Because of the cyclic nature of the deviating beams, a position can be selected within a cycle and repeated time after time to give the effect of a longer exposure for the same intermittent angle. For example, with sensor 56 constituted by a CCD array of 640×480 pixels, 307,200 different angles can be effected in one cycle. This allows for the formation of highly complex diffraction pixels. Normal cycle rates of 30–200 cycles per second are easily obtained with analog mirror drivers (64, 65). Further, shuttering rates in millions of pulses per second are also feasible with this arrangement. The beams can be deflected in a range represented by a cone perpendicular to the platen 9, and having an arc of 60°. Since the two beams (A,B) can interact with each other at virtually any angle, the object and reference beams become virtually interchangeable in this arrangement.

Among other benefits of the present invention, is that it is possible to obtain upwards of 6000 grooves per millimeter for the diffracting grating construction, and the gratings themselves can be as large as 400 by 600 millimeters. As a result, the present invention permits fabrication of holograms having substantially unlimited grating size. Since the present invention uses the interference pattern between a pair of coherent beams from a common laser source, the interference fringes are easily controlled. Thus, the present invention permits storage of a wide variety of image data, or other data selected by the user of the system.

Although a number of arrangements of this invention have been mentioned by way of example, it is not intended that the invention be limited thereto. Accordingly, the invention should be considered to include any and all configurations, modifications, variations, combinations, equivalent arrangements or expansions falling within the scope of the following claims.

I claim:

1. A method of converting an image hating a plurality of image pixels into a holographic pattern formed from a plurality of discrete holographic pixels, said method comprising the steps of:

(a) converting each of said image pixels into digital form having a plurality of digital data characteristics;

(b) manipulating a laser beam according to said digital data characteristics by splitting said laser beam into a reference beam and at least one object beam;

(c) irradiating a photosensitive surface with said reference beam and said at least one object beam to sequentially form each of said plurality of holographic pixels, each having a discrete interference pattern, each discrete interference pattern of each holographic pixel having characteristics corresponding to one of said plurality of image pixels.

2. The method of claim 1, further comprising the step of:

(d) adjusting distances between adjacent holographic pixels to indicate characteristics of said image.

* * * * *

UNITED STATES PATENT AND TRADEMARK OFFICE
CERTIFICATE OF CORRECTION

PATENT NO. : 5,822,092
DATED : October 13, 1998
INVENTOR(S) : Frank Davis

It is certified that error appears in the above-indentified patent and that said Letters Patent is hereby corrected as shown below:

On the title page, insert:

Item [73] Assignee:

Dimensional Arts

LasCruces, New Mexico 88005

Signed and Sealed this

Twenty-sixth Day of October, 1999

Attest:

Q. TODD DICKINSON

*Attesting Officer*　　　*Acting Commissioner of Patents and Trademarks*